United States Patent [19]

Kim

[11] Patent Number: 5,570,334
[45] Date of Patent: Oct. 29, 1996

[54] OPTICAL PICKUP WITH A DOUBLE REFRACTION POLARIZING PLATE TO SPLIT LIGHT BEAMS INTO TWO POLARIZED BEAMS

[75] Inventor: Seongmin Kim, Seoul, Rep. of Korea

[73] Assignee: Daewoo Electronics Co., Ltd., Seoul, Rep. of Korea

[21] Appl. No.: 348,941

[22] Filed: Nov. 25, 1994

[30] Foreign Application Priority Data

Nov. 29, 1993 [KR] Rep. of Korea ............ 93-25621

[51] Int. Cl.$^6$ ............................................. G11B 7/00
[52] U.S. Cl. ................ 369/110; 369/44.37; 369/107; 369/112
[58] Field of Search ................ 369/110, 44.37, 369/112, 44.23, 107, 109

[56] References Cited

U.S. PATENT DOCUMENTS

| | | |
|---|---|---|
| 5,128,914 | 7/1992 | Kurata et al. ............ 369/44.37 |
| 5,153,863 | 10/1992 | Noda et al. ............ 369/44.37 |
| 5,155,717 | 10/1992 | Bakx ............ 369/44.37 |
| 5,383,169 | 1/1995 | Shinoda et al. ............ 369/44.37 |
| 5,434,841 | 7/1995 | Nishikawa ............ 369/121 |
| 5,471,455 | 11/1995 | Jabr ............ 369/107 |

Primary Examiner—Georgia Y. Epps
Assistant Examiner—Kim-Kwok Chu
Attorney, Agent, or Firm—Oliff & Berridge

[57] ABSTRACT

An optical pickup apparatus to produce two polarized beams to be irradiated onto a given track of a recording medium with neighboring each other. The optical pickup apparatus includes a laser light source for generating beams irradiated on a recording medium, a beam splitter for reflecting beams vertically and for transmitting the beam reflected from the recording medium, a double refraction polarization means for separating the beams into first and second polarized beams and for transmitting a reflected first and second polarized beams so as to have a same beam path, a polarization been splitter for reflecting the reflected first polarized beam passing and for transmitting the reflected second polarized beam, and at least one photodetecting means for separately receiving the reflected first and second polarized beams. The optical pickup apparatus is able to reduce detection errors resulting from some defects made on the surface of the recording medium. Further, a serial current and noise can be reduced and the number of the components of the optical pickup apparatus may be reduced to lower the production cost.

12 Claims, 5 Drawing Sheets

OPTICAL PICKUP WITH A DOUBLE REFRACTION POLARIZING PLATE TO SPLIT LIGHT BEAMS INTO TWO POLARIZED BEAMS

BACKGROUND OF THE INVENTION

1. Field of the Invention

The present invention relates to an optical pickup apparatus, and more particularly, to an optical pickup apparatus using a double reflection polarizing plate.

2. Description of the Prior Art

In general, optical pickup apparatuses that are used in compact disc reproduction apparatuses and the like use a diffraction device or a holographic optical element so that the number of components of the optical pickup apparatus can be reduced. The optical pickup apparatuses that are used in the compact disc reproduction apparatuses and the like employ a three spot method, in which two sub-beams for detecting a tracking error in addition to the main beam are used, in order to detect a tracking error signal. An example of techniques using the above three spot method is disclosed in U.S. Pat. No. 5,128,914.

FIG. 1 is a side view for illustrating a conventional optical pickup apparatus. The optical pickup apparatus includes a diffraction device 2, an optical system and a light element 7 including at least one of photodetectors and a light source 1. In the above optical pickup apparatus, a laser beam A emitted from light source 1 is diffracted through diffraction device 2 into three-separated light beams. One of the three-separated light beams is a zero-order diffracted beam A1, which is focused on a recording medium 5 through the optical system as a main beam. The others of the three-separated light beams which correspond to two sub-beams A2 and A3 obtained by means of the above three spot method are two first-order diffracted beams which have respectively different directions, i.e., positive and negative directions. The two first-order diffracted beams A2 and A3 are positioned symmetrically to the main beam and shift to the tracking direction to be focused on the recording medium. The beams reflected on recording medium 5 are diffracted by diffraction device 2 to make the first-order diffracted beams, which are focused on a photodetector 6. Regions 2a, 2b and 2c of the diffraction device which produce the sub-beams A2 and A3 of the three spot method have brazing characteristics so as to strengthen the light intensity of the first-order diffracted beam alone that proceeds in the positive direction, a sufficient sensitivity being obtainable by means of light element 7 wherein light source 1 and photodetector 6 are integrated instead of plural photodetectors. Light element 7 is divided into at least three regions in the same way as that of the well known three spot method. The regions are irradiated with the corresponding beams diffracted by the diffraction device. The corresponding beams resulting from diffraction are focused on light element 7 to produce an output signal of light element 7. A focus signal is obtained by the output signal by means of a knife edge method. A tracking error signal can be detected based on the three-spot method from a difference between the light intensities of the diffracted beams resulting from the sub-beams A2 and A3. The tracking error signal according to the prior art can be detected based on the three spot method, and thus an offset never arises in the tracking error signal even when the optical axis of the optical system is displaced from a given position. Moreover, because of the use of a diffraction device, the number of components of the optical system can be reduced. Further, light source 1 and photodetector 6 are incorporated into one body by disposing them within a package and the diffraction device is used as a window that seals the package, so that the production cost of the optical pickup apparatus can be lowered.

However, since the optical pickup apparatus using the diffraction device detects the error signal by employing the diffracted beams, in case that the recording medium such as an optical disc is slantingly positioned or there are some defects on the surface of the recording medium, the detection signal would change or deviate from the given position, so that the photodetector can not help erroneously detecting the signals. On the contrary, an optical pickup apparatus using a double refraction polarizing plate according to the present invention detects the polarized beams, so that the optical pickup apparatus can remove detection errors resulting from some defects made on the surface of the recording medium.

SUMMARY OF THE INVENTION

The present invention is intended to overcome the above-discussed and numerous other disadvantages and deficiencies of the prior art.

Therefore, it is an object of the present invention to provide an optical pickup apparatus using a double refraction polarizing plate in order to produce two polarized beams which are to arrive at given tracks of a recording medium with neighboring each other.

It is also another object of the present invention to provide an optical pickup apparatus using a double refraction polarizing plate in order to split two polarized beams reflected from a disc at the time of reading out data on a recording medium.

To achieve the above-described objects of the present invention, an optical pickup apparatus according to the present invention comprises:

a laser light source for generating beams which are irradiated on a recording medium;

a beam splitter for reflecting the beams vertically to be irradiated onto a surface of the recording medium and for passing a beam reflected from the recording medium;

a polarizing device for splitting the beams reflected vertically by the beam splitter into a first and second polarized beams which are irradiated onto the recording medium disc and for transmitting a reflected first and second polarized beams so as to have a same beam path for being irradiated onto the beam splitter;

a polarized beam separating device for reflecting the reflected first polarized beam passing through the polarizing device and for transmitting the reflected second polarized beam; and at least one photodetecting device for separately receiving the reflected first and second polarized beams.

According to one preferred embodiment of the present invention, the polarizing device which splits the beams into the first and second polarized beams which are irradiated on the recording medium may be a double refraction polarizing plate.

According to another preferred embodiment of the present invention, as the polarizing device and the device for separating the polarized beam first and second double refraction polarizing plates may be used, respectively.

The optical pickup apparatus of the present invention introduces two polarized beams on a given track of a recording medium with the use of a double refraction polarizing plate and separates beams reflected from the recording medium into two polarized beams to be detected by at least one photodetecting device, so that it is able to reduce detection errors resulting from some defects made on the surface of the recording medium. Also, due to use of a double refraction polarizing plate in order to make two split polarized beams, the number of components can be greatly reduced. Further, a signal detection method according to the present invention is used in the same way as that of peak to peak, so that dc signal and noise generated by using a full aperture method can be reduced.

BRIEF DESCRIPTION OF THE DRAWINGS

The above objects and other advantages o he present invention will become more apparent by describing in detail a preferred embodiment thereof with reference to the attached drawings in which.

DESCRIPTION OF THE PREFERRED EMBODIMENT

Hereinafter, the preferred embodiments of an optical pickup apparatus of the present invention will be described in detail with reference to the accompanying drawings.
Embodiment 1

Figure 1:
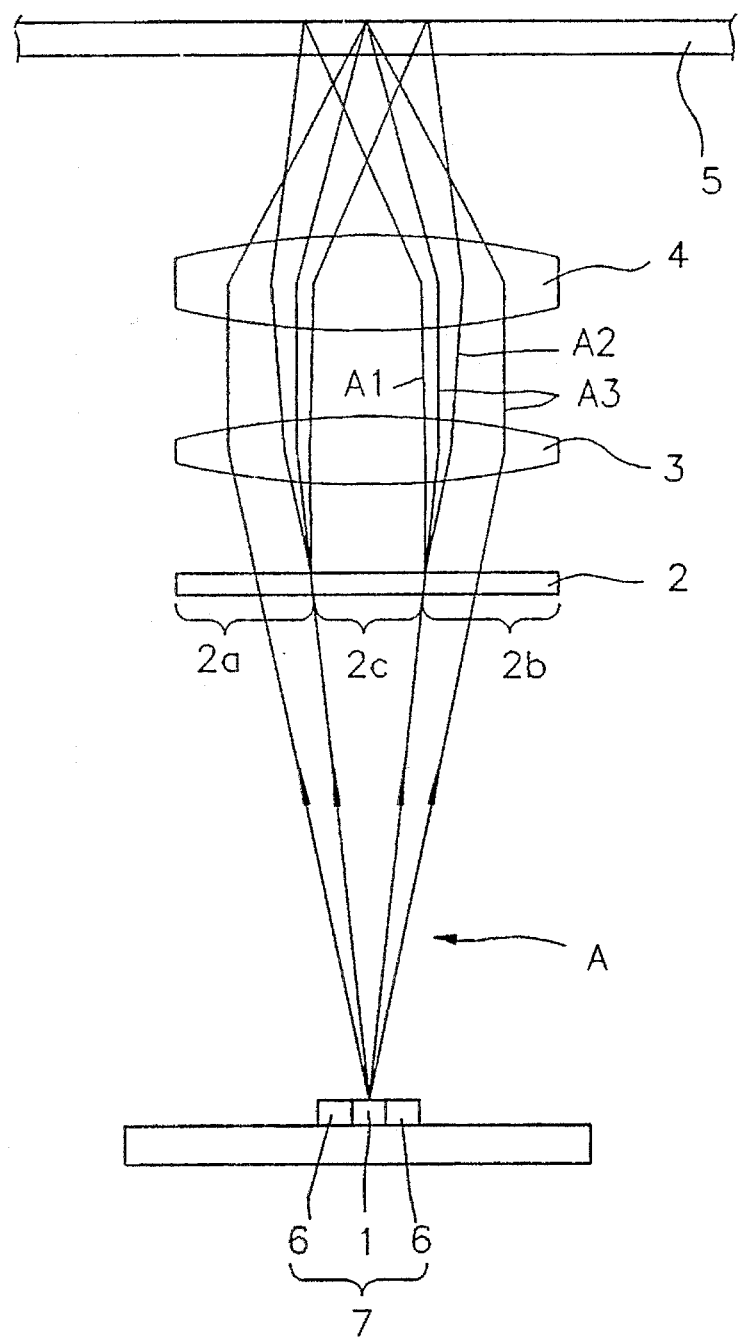
FIG. 1 is 8 side view for illustrating a conventional optical pickup apparatus.
Figure 2:
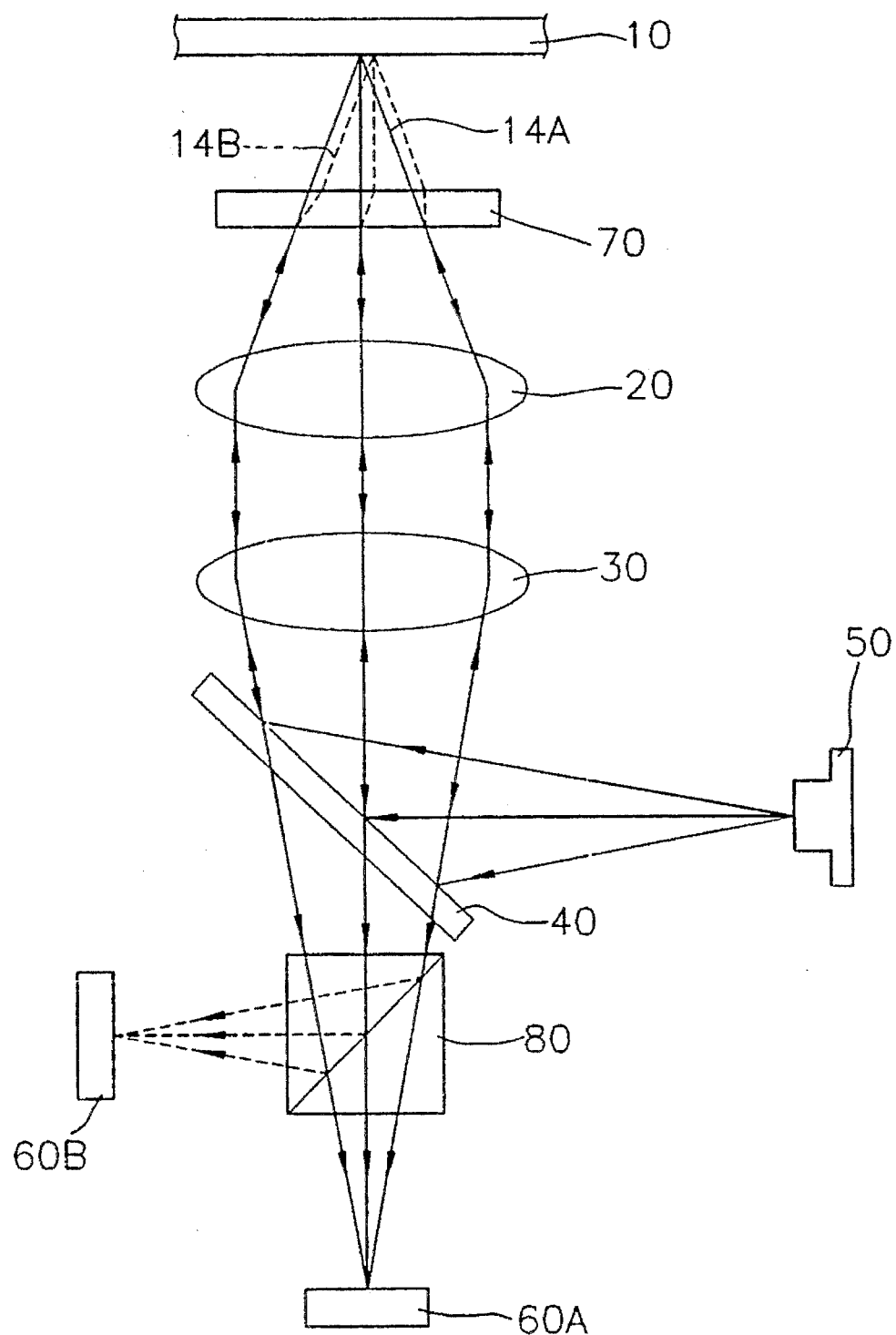
FIG. 2 is a side view for illustrating an optical pickup apparatus according to a first embodiment of the present invention.

FIG. 2 is a side view for illustrating an optical pickup apparatus according to a first embodiment of the present invention.

As shown in FIG. 2, a semiconductor laser diode 50 is used as a laser light source generating a beam which is used in reading out information recorded on a disc 10 as a recording medium. The beam produced by laser diode 50 is irradiated on a beam splitter 40, which reflects a part of incident light beams and transmits a part of incident light beams as a semi-transmittance mirror made by a well-known technique.

The beam emitted from laser diode 50 to be irradiated on the beam splitter is changed into a parallel beam by a collimating lens 30 to arrive at an object lens 20.

Figure 3:
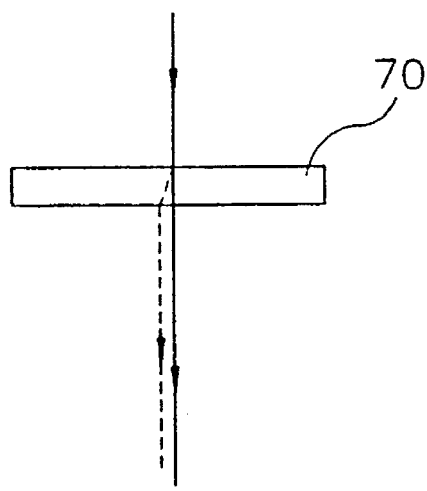
FIG. 3 is a view for explaining in detail an operation of a double refraction polarizing plate.

Object lens 20 traps the parallel beams by means of a polarizing device. The trapped beam is split into first and second polarized beams 14A and 14B having different neighboring beam paths by a polarizing device, which form individual spots on a surface of disc 10. The polarizing device comprises a double refraction polarizing plate 70 as shown in FIG. 3. The trapped beams on double refraction polarizing plate 70 are separated in accordance with the polarization direction and thus, go through the respective and different path to be split into the two polarized beams, namely first and second polarized beams 14A and 14B, which are shown respectively in a solid line and a dotted line in FIG. 3. At that time, first and second polarized beams 14A and 14B have a relationship perpendicular to each other in polarization direction. For example, first polarized beam 14A is in a vertical polarization direction but second polarized beam 14B is in a horizontal polarization direction. The beams trapped by object lens 20 go through double refraction polarizing plate 70 to be split into first and second polarized beams 14A and 14B of which one shifts toward a side from the given path of the trapped beam, so that beam spots of the polarized beams are separately formed on disc 10 with neighboring each other.

Figure 4:
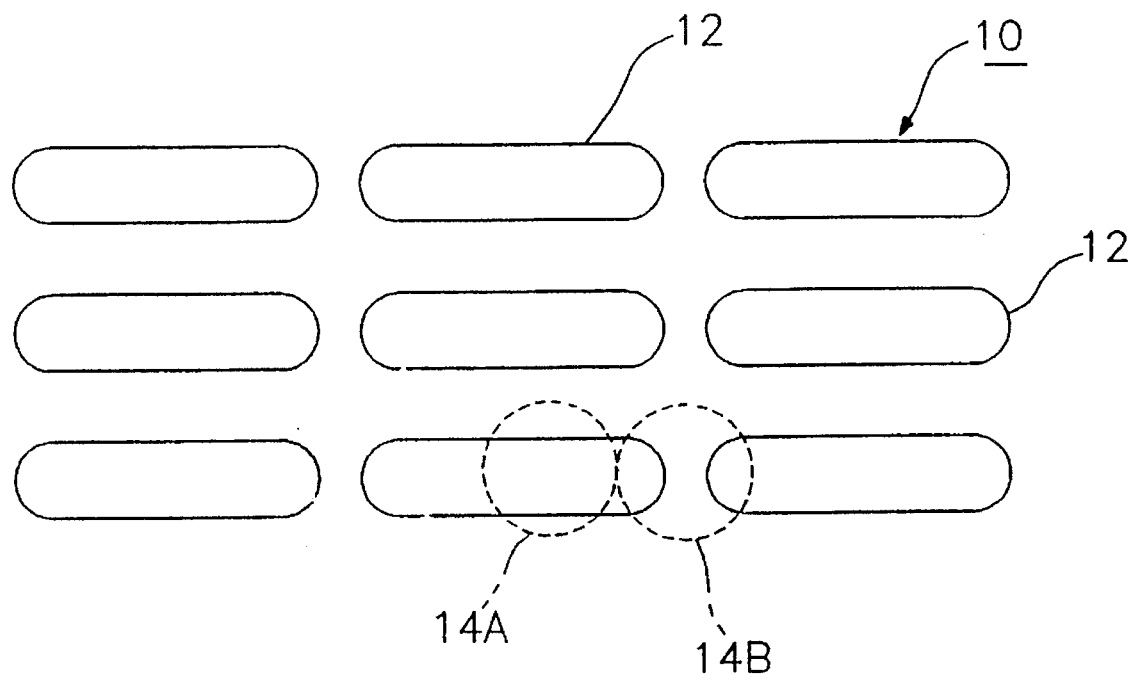
FIG. 4 is a diagram for showing a first and second polarized beam irradiated onto pits of a recording medium by an optical pickup apparatus of the present invention.

FIG. 4 illustrates a beam spot formation of first and second polarized beam 14A and 14B on disc 10. Reference numeral 12 corresponds to pit arrays formed on disc 10. Two circles which are positioned on one of pit arrays 12 indicate first and second polarized beams 14A and 14B, which are different polarization directions from each other.

First and second polarized beams 14A and 14B reflected from disc 10 again pass through double refraction polarizing plate 70 so that reflected first and second polarized beams have a same beam path and then pass collimating lens 30 to,be irradiated on beam splitter 40. At the same time beams reaching beam splitter 40 are partially reflected to the laser diode direction, which do not have a great influence on laser diode 50.

The beams passing through beam splitter 40 are reflected thereby and transmitted therethrough according to the polarization state of beams by polarization beam splitter 80. That is so say that if first polarized beam 14A is reflected by polarization beam splitter 80, second polarized beam 14B is transmitted through polarization beam splitter 80. The reverse thereof is, of course, possible. Polarization beam splitter 80 can be manufactured by any known technique. Polarization beam splitter 80 has a function of the selectively reflecting and transmitting the beams according to the polarization direction of the irradiated beam.

The reflected first and second polarized beams separated by means of polarization beam splitter 80 are received in two photodetecting elements 60A and 60B. Namely, first polarized beam 14A transmitting in a irradiated beam direction through polarization beam splitter 80 is received in photodetecting element 60A and second polarized beam 14B reflecting perpendicular to the irradiated beam by polarization beam splitter 80 is received in second photodetecting element 60B. The photodetecting elements are photodiodes 60A and 60B. A differential amplifier 90 (see FIGS. 5B and 5D) for reading out information recorded on disc 10 with the use of a signal difference detected by photodiodes 60A and 60B is attached to photodiodes 60A and 60B.

Figure 5A:
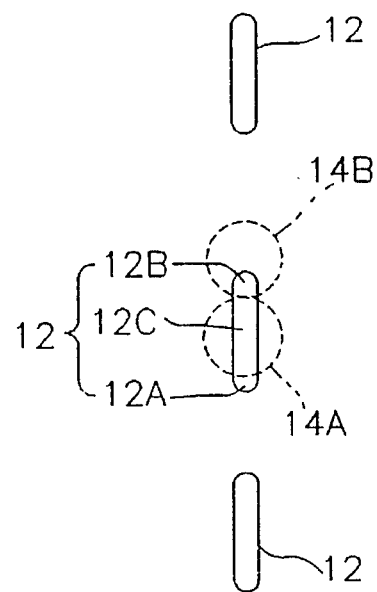
FIGS. 5A to 5D are diagrams for showing a process for signal detection in an optical pickup apparatus of the present invention.
Figure 5B:
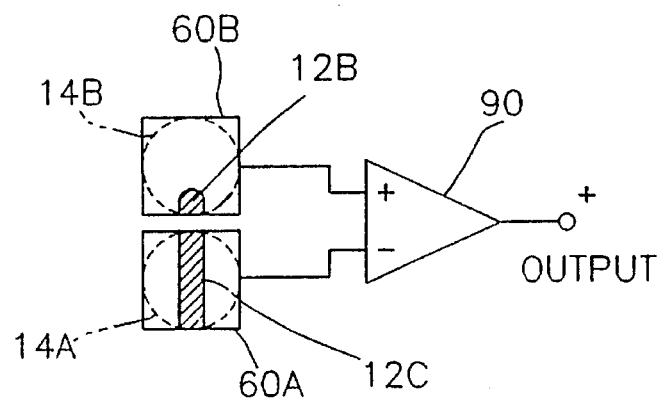
Figure 5C:
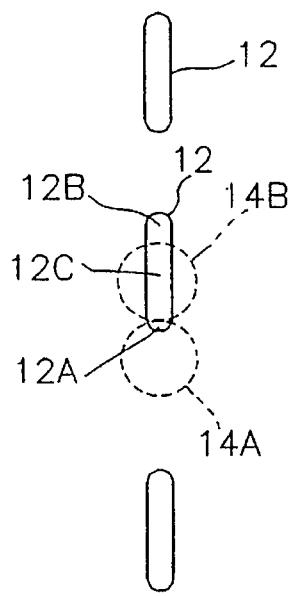
Figure 5D:
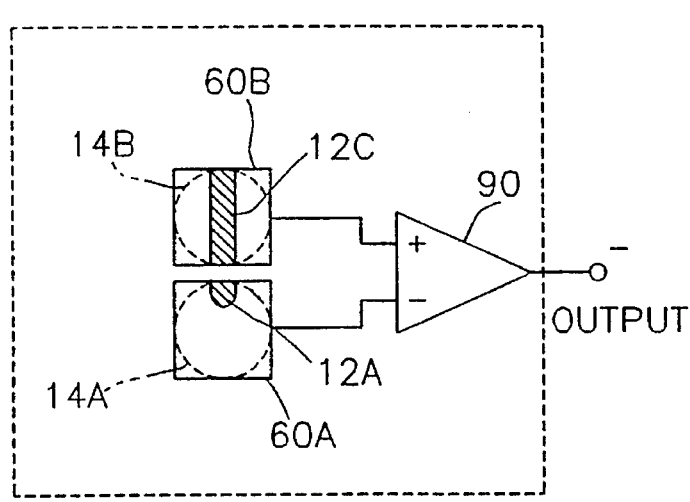

FIGS. 5A to 5D illustrate a detailed process of reading out data by detecting the signal difference of the polarized beams detected by photodiodes 60A and 60B. FIGS. 5A and 5C show pit arrays 12 and positional relationship of two polarized beams 14A and 14B irradiated onto pit arrays 12. FIGS. 5B end 5D show the detailed positional relationship of those shown in FIGS. 5A and 5C, which is seen from the two photodiodes. There are additionally shown the differential amplifiers in FIGS. 5B and 5D. First, as shown in FIGS. 5A to 5D, pit arrays 12 are formed on disc 10 and first and second polarized beams 14A and 14B are positioned with neighboring each other. As shown in FIG. 5A, when first polarized beam 14A is positioned on the center 12C of pit array 12 and second polarized beam 14B is positioned on the end 12B of pit array 12, as shown in FIG. 5B, differential amplifier 90 produces a positive signal output.

If pit array 12 shifts from first polarized beam 14A to second polarized beam 14B, as shown in FIG. 5C, first polarized beam 14A is positioned on the end 12A of pit array 12 and second polarized beam 14B is positioned on the center 12C of pit array 12, so that differential amplifier 90 produces a negative output signal.

Thus, information recorded on the surface of disc 10 can be read out with the use of signal difference obtained by relative positional relationship of first and second polarized beams 14A and 14B and pit array 12.

Embodiment 2

Figure 6:
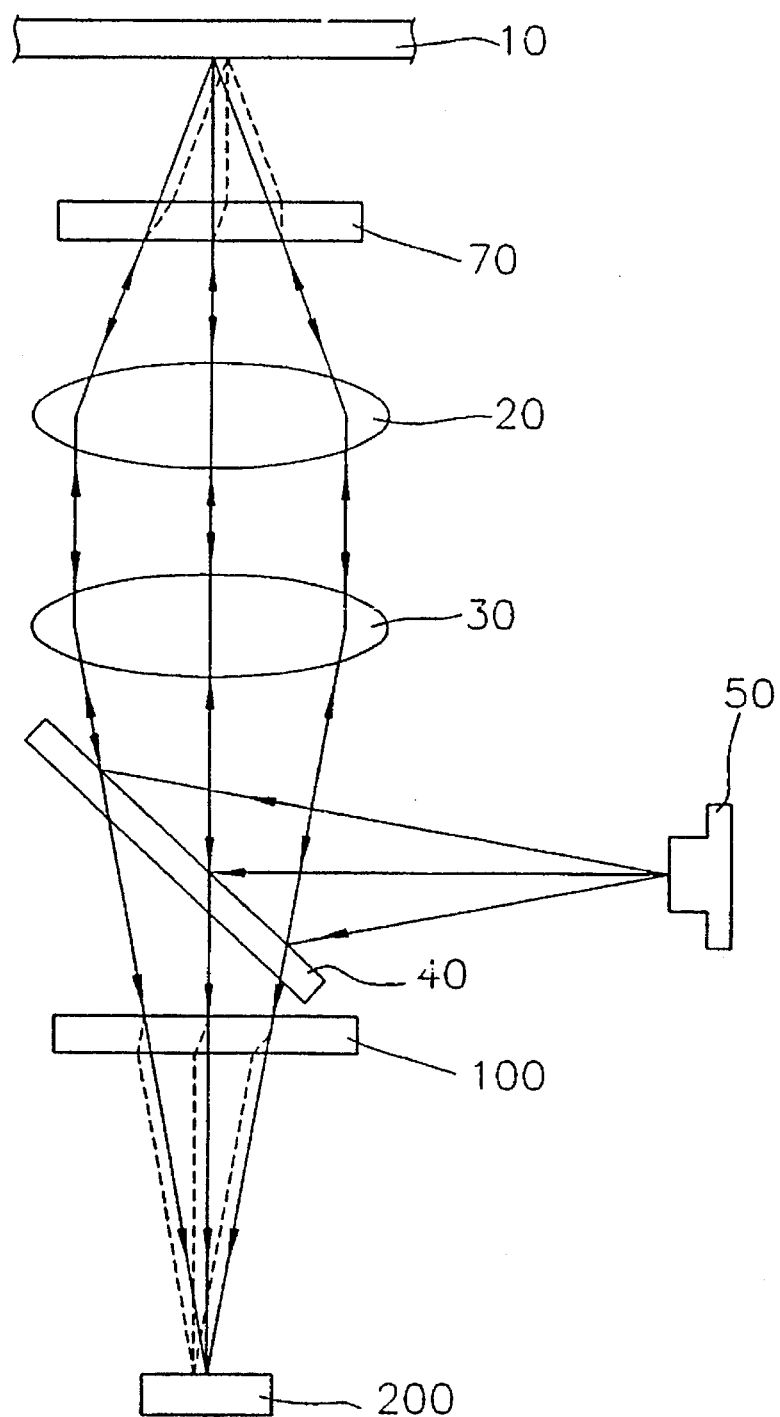
FIG. 6 is a side view of second embodiment according to the present invention.

FIG. 6 a side view for illustrating an optical pickup apparatus according to a second embodiment of the present invention.

In case of designating the same parts as those of FIG. 2 showing Embodiment 1, the same reference numerals are employed in FIG. 6 showing the second embodiment, and in case of designating the different parts from those of FIG. 2, different reference numerals are used.

In the optical pickup apparatus according to the present embodiment, a double refraction polarizing plate 70 used in the first embodiment instead of a polarization beam splitter 80 used in the first embodiment is employed to separate polarized beams.

In the same way of that of Embodiment 1, beams generated from a laser diode 50 are reflected on a beam splitter 40 to be irradiated toward a disc 10, and thus go through a collimating lens 30 and an object lens 20 to arrive at a first double refraction polarizing plate 70.

First and second polarized beams 14A and 14B, which are polarized and separated by first double refraction polarizing plate 70, are reflected on disc 10 and pass through the above components in inverse order and then are transmitted through beam splitter 40. The above is the same as in Embodiment 1.

On the contrary, in the present embodiment a polarizing splitter used to separate the reflected first and second polarized beams in Embodiment 1 is replaced with a second double refraction polarizing plate 100, so that beam passing through beam splitter 40 is again separated respectively into the reflected first and second polarized beams having different neighboring beam paths by second double reflection polarization plate 100.

A photodetecting element 200 where two photodiodes are incorporated into one body is used for detecting first and second polarized beams 14A and 14B in the present embodiment, while the two separate photodiodes are employed to separately receive the first and second polarized beams 14A and 14B in Embodiment 1.

Also, as first and second polarized beams 14A and 14B are positioned with neighboring each other on pits on disc 10 by means of first double refraction polarizing plate 70, first and second polarized beam 14A and 14B reflected on disc 10 separately form spots with neighboring each other by means of second double refraction polarizing plate 100, which makes possible the use of the single photodetecting element where the two photodiodes are integrated therein.

Then, it is possible for an attached differential amplifier 90 to read out data recorded on the disc 10 with the use of signal difference of first and second polarized beams 14A and 14B which are detected by means of the photodiodes.

The optical pickup apparatus of the present invention introduces two polarized beams on a given track of the recording medium with the use of the double refraction polarizing plate and separates the beams reflected from the recording medium into the two polarized beams for a photodetecting device to receive, so that detection errors resulting from some defects made on the surface of the recording medium can be reduced. In addition, since the double refraction polarizing plate is used in order to form the two separate polarized beams, the number of components of the optical pickup apparatus can be greatly reduced.

Further, the signal detection method used in the present invention is similar to that of peak to peak, which makes possible reduction of a serial current and noise generated by the use of a full aperture method.

Replacement of the polarizing beam splitter with the double refraction polarizing beam splitter and using the photodetecting device having the two photodiodes incorporated into one body makes possible reduction of the number of the components of the optical pickup apparatus, which results in lowering the production cost.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. An optical pickup apparatus, comprising:

a laser light source for generating a plurality of beams which are irradiated on a recording medium;

a beam splitter for reflecting the beams vertically to be irradiated onto a surface of the recording medium and for passing a beam reflected from the recording medium;

a polarizing means for splitting the beams reflected vertically by the beam splitter into first and second polarized beams which are irradiated onto the recording medium disc and for transmitting reflected first and second polarized beams so as to have a same beam path for being irradiated onto the beam splitter;

a polarized beam separating means for reflecting the reflected first polarized beam passing through the polarizing means and for transmitting the reflected second polarized beam; and at least one photodetecting means for separately receiving the reflected first and second polarized beams.

2. The optical pickup apparatus as claimed in claim 1, wherein the polarizing means is a double refraction polarizing plate.

3. The optical pickup apparatus as claimed in claim 1, wherein the beam splitter is a semi-transparent mirror.

4. The optical pickup apparatus as claimed in claim 1, wherein polarized beam separating means is a polarization beam splitter.

5. The optical pickup apparatus as claimed in claim 1, wherein polarized beam separating means is a double refraction polarizing plate.

6. The optical pickup apparatus as claimed in claim 1, wherein the photodetection means comprises two separate photodiodes.

7. The optical pickup apparatus as claimed in claim 1, wherein the photodetection means are two photodiodes incorporated into one body.

8. An optical pickup apparatus, comprising:

a laser light source for generating a plurality of beams which are irradiated on a recording medium;

a beam splitter for reflecting the beams vertically to be irradiated onto a surface of the recording medium and for transmitting a beam reflected from the recording medium;

a double refraction polarization means for splitting the beams reflected vertically by the beam splitter into first and second polarized beams which are irradiated onto the recording medium disc and for transmitting reflected first and second polarized beams so as to have a same beam path for being irradiated onto the beam splitter;

a polarized beam splitter for reflecting the reflected first polarized beam passing through the polarizing means and for transmitting the reflected second polarized beam; and at least one photodetecting means for separately receiving the reflected first and second polarized beams.

9. The optical pickup apparatus as claimed in claim 8, wherein the polarization directions of the first and second polarized beams are perpendicular to each other.

10. The optical pickup apparatus as claimed in claim 8, said optical pickup apparatus further comprising an object lens between said double refraction polarization means and said beam splitter to focus the beams on the disc.

11. The optical pickup apparatus as claimed in claim 10, said optical pickup apparatus further comprising a collimating lens between said object lens and said beam splitter for converting the beams reflected by the beam splitter into the parallel beams.

12. An optical pickup apparatus, comprising:

a laser light source for generating a plurality of beams which are irradiated on a recording medium;

a beam splitter for reflecting the beams vertically to be irradiated onto a surface of the recording medium and for transmitting a beam reflected from the recording medium;

a first double polarization means for splitting the beams reflected vertically by the beam splitter into first and second polarized beams which are irradiated onto the recording medium and for transmitting reflected first and second polarized beams so as to have a same beam path for being irradiated onto the beam splitter;

a second double polarization means for separating the reflected first and second polarized beams so as to have different neighboring beam paths; and at least one photodetecting means for separately receiving the reflected first and second polarized beams.

\* \* \* \* \*